(12) United States Patent
Chang et al.

(10) Patent No.: US 11,187,913 B2
(45) Date of Patent: Nov. 30, 2021

(54) X-TYPE ADJUSTMENT MODULE, AND LIGHT COMBINING DEVICE AND PROJECTOR USING THE X-TYPE ADJUSTMENT MODULE

(71) Applicant: Coretronic Corporation, Hsin-Chu (TW)

(72) Inventors: Li-Wei Chang, Hsin-Chu (TW); Chien-Chi Shen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 341 days.

(21) Appl. No.: 16/172,675

(22) Filed: Oct. 26, 2018

(65) Prior Publication Data
US 2019/0129189 A1    May 2, 2019

(30) Foreign Application Priority Data
Oct. 31, 2017    (CN) .......................... 201711054186.9

(51) Int. Cl.
*G02B 27/10*    (2006.01)
*G02B 7/00*    (2021.01)
(Continued)

(52) U.S. Cl.
CPC ......... *G02B 27/1046* (2013.01); *G02B 7/003* (2013.01); *G02B 27/144* (2013.01);
(Continued)

(58) Field of Classification Search
CPC . G02B 7/02; G02B 7/04; G02B 7/102; G02B 3/14; G02B 7/026; G03B 17/00;
(Continued)

(56) References Cited

U.S. PATENT DOCUMENTS

| | | | |
|---|---|---|---|
| 5,042,912 A * | 8/1991 | Sato ..................... | G02B 27/149 359/638 |
| 2013/0038845 A1* | 2/2013 | Wang ................. | G03B 21/2046 353/94 |

(Continued)

FOREIGN PATENT DOCUMENTS

| | | |
|---|---|---|
| CN | 1452725 A | 10/2003 |
| CN | 101770078 A | 7/2010 |

(Continued)

*Primary Examiner* — Brandi N Thomas

(57) ABSTRACT

The invention discloses an X-type adjustment module, comprising a cover, a first frame, a second frame, a first light transmitting element, a second light transmitting element, a first adjustment member, and a second adjustment member. The first frame is pivotally connected to the cover. The second frame is pivotally connected to the first frame and intersects the first frame. The first light transmitting element is fixed in the first frame. The second light transmitting element is fixed in the second frame and intersects the first light transmitting element. The first adjustment member passes through the cover and abuts against the first frame. The second adjustment member passes through the cover and abuts against the second frame. A transmission path of a light beam is controlled by adjusting disposition angles of the first light transmitting element and the second light transmitting element to avoid excessive concentration of light energy.

9 Claims, 10 Drawing Sheets

(51) Int. Cl.
*G03B 21/20* (2006.01)
*G02B 27/14* (2006.01)
(52) U.S. Cl.
CPC ......... *G02B 27/145* (2013.01); *G02B 27/149* (2013.01); *G03B 21/2033* (2013.01)
(58) Field of Classification Search
CPC .... G03B 35/08; H04N 5/2254; H04N 5/2257; H04N 1/024; H04N 2201/02458; H04N 2201/02466; H04N 2201/02468; H04N 2201/02477; H04N 2201/02481
See application file for complete search history.

(56) References Cited

U.S. PATENT DOCUMENTS

| | | | |
|---|---|---|---|
| 2013/0264538 A1* | 10/2013 | Oh | H01L 33/60 257/13 |
| 2016/0131336 A1* | 5/2016 | Kim | G02B 1/02 362/84 |

FOREIGN PATENT DOCUMENTS

| | | |
|---|---|---|
| CN | 102053324 A | 5/2011 |
| CN | 102436048 A | 5/2012 |
| CN | 103217797 A | 7/2013 |
| CN | 102436048 B | 10/2014 |
| TW | 523118 U | 3/2003 |

* cited by examiner

X-TYPE ADJUSTMENT MODULE, AND LIGHT COMBINING DEVICE AND PROJECTOR USING THE X-TYPE ADJUSTMENT MODULE

CROSS-REFERENCE TO RELATED APPLICATION

This application claims the priority benefit of China application (CN201711054186.9 filed on 2017 Oct. 31). The entirety of the above-mentioned patent application is hereby incorporated by reference herein and made a part of this specification.

FIELD OF THE INVENTION

The invention relates to an optical element, and more particularly to an X-type adjustment module, and a light combining device and a projector using the X-type adjustment module.

BACKGROUND OF THE INVENTION

The type of a light source used by a projector is evolved from an ultra-high pressure mercury lamp (UHP lamp), a light emitting diode (LED) to a laser diode (LD), according to the market requirements for the luminance, color saturation, service life, non-toxic, environmental protection, and the like of the projector.

Currently, the costs of a red laser diode and a green laser diode with high luminance are too high. In order to reduce the costs, a blue laser diode is usually utilized to excite a phosphor on a phosphor wheel to generate yellow light and green light. The desired red light is filtered out through a color wheel. And then, the blue light emitted by the blue laser diode is accompanied to constitute the three primary colors of red, green and blue, which are required for the projection screen.

In the prior art, in order to enhance the luminance, some utilize three light source groups of the blue laser diode. Each of the three light source groups of the blue laser diode includes a plurality of blue laser diodes. The blue light provided by the blue laser diodes is combined by an X-type light combining element. Ideally, the blue light provided by the blue laser diodes should not overlap with each other after being combined, so as to avoid the risk of burning the phosphor due to excessive concentration of energy when the phosphor wheel is irradiated. Therefore, in such a light combining mode, the requirements on the accuracy of the X-type light combining element itself and the accuracy of the assembly positioning of the X-type light combining element are very high, resulting in poorer assembly efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an X-type adjustment module. Disposition angles of a first light transmitting element and a second light transmitting element can be individually adjusted by disposition angles of two frames of the X-type adjustment module, so as to control a transmission path of a beam to prevent light energy from being too concentrated.

The invention further provides a light combining device and a projector, for improving assembly efficiency.

Other objectives and advantages of the invention can be further understood from the technical features disclosed in the invention.

In order to achieve one or a portion of or all of the objectives or other objectives, an embodiment of the invention provides an X-type adjustment module, comprising a cover, a first frame, a second frame, a first light transmitting element, a second light transmitting element, a first adjustment member, and a second adjustment member. The first frame is pivotally connected to the cover. The second frame is pivotally connected to the first frame and intersects the first frame. The first light transmitting element is fixed in the first frame. The second light transmitting element is fixed in the second frame and intersects the first light transmitting element. The first adjustment member passes through the cover and abuts against the first frame. The first adjustment member is used for driving the first frame to rotate. The second adjustment member passes through the cover and abuts against the second frame. The second adjustment member is used for driving the second frame to rotate.

In order to achieve one or a portion of or all of the objectives or other objectives, an embodiment of the invention provides a light combining device, comprising a base and an X-type adjustment module. The X-type adjustment module includes a cover, a first frame, a second frame, a first light transmitting element, a second light transmitting element, a first adjustment member, and a second adjustment member. The base has a bottom and an opening. The opening is disposed opposite to the bottom. The cover is fixed to the opening. The first frame is pivotally connected between the bottom of the base and the cover. The second frame is pivotally connected to the first frame and intersects the first frame. The first light transmitting element is fixed in the first frame. The second light transmitting element is fixed in the second frame and intersects the first light transmitting element. The first adjustment member passes through the cover and abuts against the first frame. The first adjustment member is used for driving the first frame to rotate. The second adjustment member passes through the cover and abuts against the second frame. The second adjustment member is used for driving the second frame to rotate.

In order to achieve one or a portion of or all of the objectives or other objectives, an embodiment of the invention provides a projector, comprising an illumination system, a light valve, and a projection lens. The illumination system is used for providing an illumination beam. The light valve is disposed on a transmission path of the illumination beam to convert the illumination beam into an image beam. The projection lens is disposed on a transmission path of the image beam to project the image beam. The illumination system includes the light combining device and three light source groups. The light source groups are disposed at three sides of the light combining device. Each of the light source groups includes a plurality of point light sources. Each of the point light sources is used for providing a sub-beam. The light combining device is used for combining the sub-beams.

In the light combining device of the embodiment of the invention, the first frame is pivotally connected between the bottom of the base and the cover, and the second frame is pivotally connected to the first frame. Therefore, the disposition angles of the first frame and the second frame can be individually adjusted. The disposition angles of the first light transmitting element and the second light transmitting element that are disposed at the first frame and the second frame can also be adjusted accordingly. Since the projector of the embodiment of the invention utilizes this light combining device, a transmission path of the sub-beam, which is provided by the light source group and has been reflected, can be controlled by adjusting the disposition angles of the first light transmitting element and the second light transmitting element, so as to help to improve the assembly efficiency of the projector.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
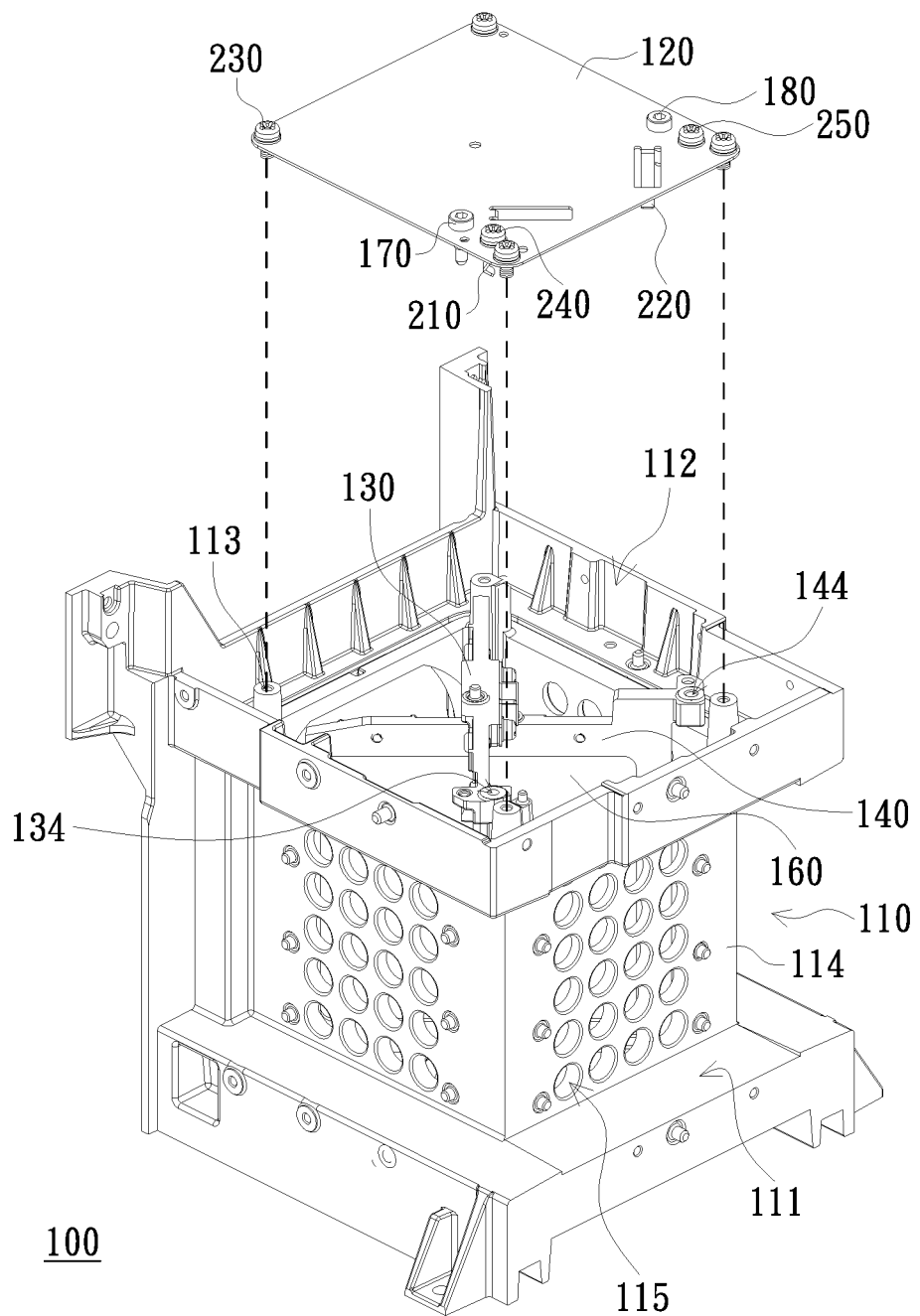
FIG. 1 is a schematic perspective view of a light combining device of an embodiment of the invention.
Figure 2:
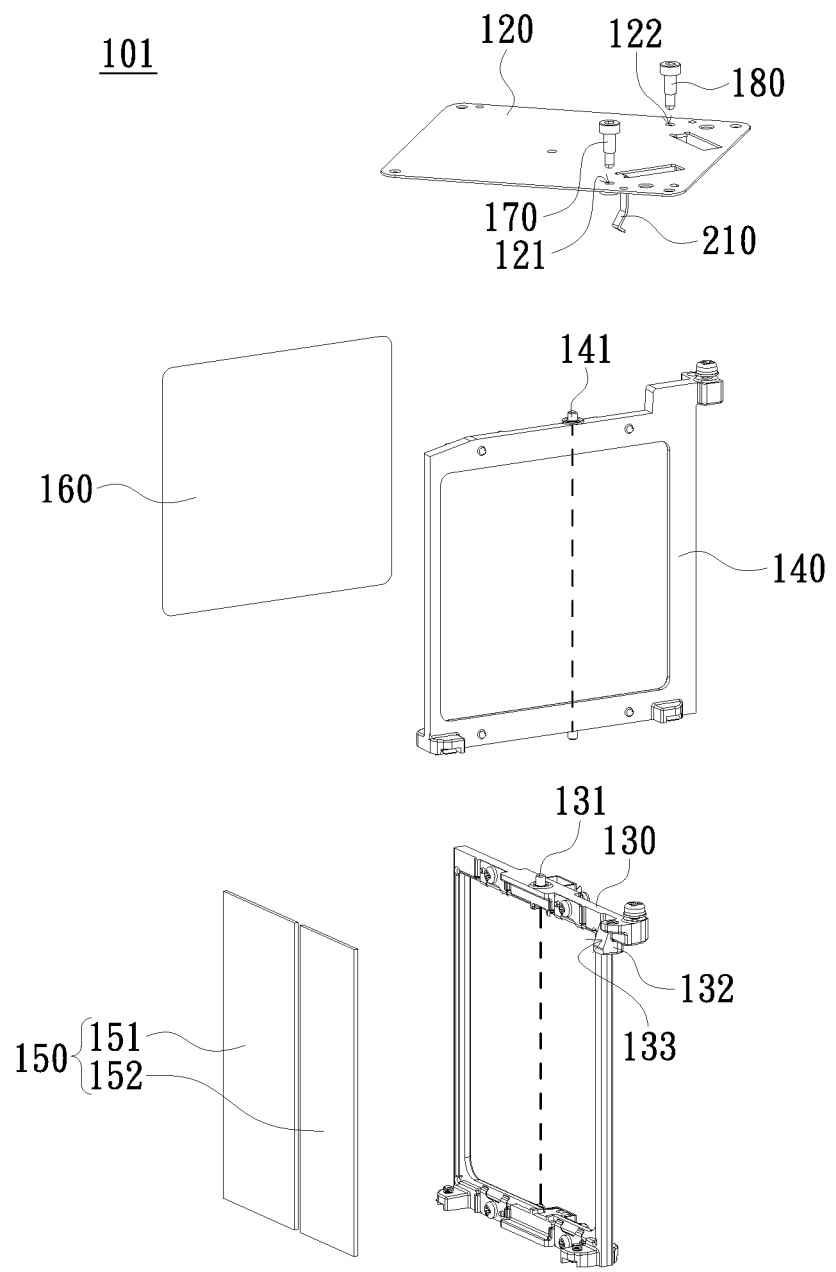
FIG. 2 is a schematic view of an X-type adjustment module of an embodiment of the invention.

FIG. 1 is a schematic perspective view of a light combining device of an embodiment of the invention. FIG. 2 is a schematic view of an X-type adjustment module. Please refer to FIG. 1 and FIG. 2. The light combining device 100 of the embodiment includes a base 110 and an X-type adjustment module 101. The X-type adjustment module 101 includes a cover 120, a first frame 130, a second frame 140, a first light transmitting element 150, a second light transmitting element 160, a first adjustment member 170, and a second adjustment member 180. The base 110 has a bottom 111 and an opening 112. The opening 112 is opposite to the bottom 111. The cover 120 of the X-type adjustment module 101 is fixed to the opening 112. In the embodiment, the base 110 has, for example, a plurality of fixing holes 113, disposed at the opening 112. In this way, a plurality of fixing members 230 can pass through the cover 120 and be fixed in the fixing holes 113 to fix the cover 120 to the opening 112. The fixing hole 113 is, for example, a screw hole. The fixing member 230 is, for example, a screw, but the invention is not limited thereto. It is worth mentioning that the X-type adjustment module 101 can be fixed through being inserted from the opening 112 of the base 110 into the base 110.

Figure 3:
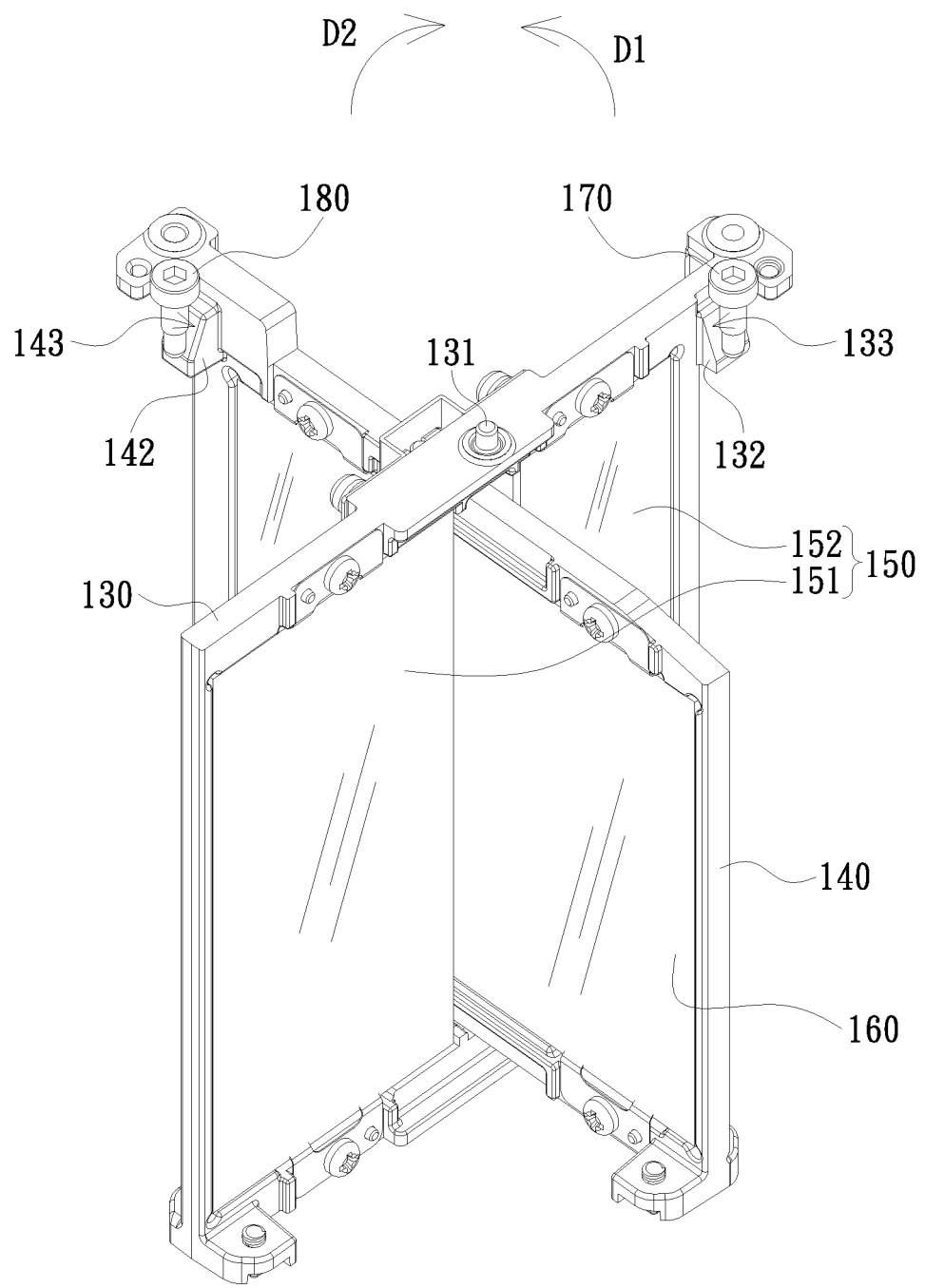
FIG. 3 is a schematic assembled view of the partial elements of FIG. 2.

FIG. 3 is a schematic assembled view of the partial elements of FIG. 2. The cover 120 of FIG. 2 is omitted in FIG. 3. Please refer to FIG. 2 and FIG. 3. The first frame 130 is pivotally connected between the bottom 111 of the base 110 of FIG. 1 and the cover 120. The second frame 140 is pivotally connected to the first frame 130 and intersects the first frame 130. Specifically, the first frame 130 has, for example, a first pivot shaft 131 (the axis is indicated by a dotted line), pivotally connected between the bottom 111 of the base 110 of FIG. 1 and the cover 120. The second frame 140 has, for example, a second pivot shaft 141 (the axis is indicated by a dotted line), pivotally connected to the first frame 130. In the embodiment, the first pivot shaft 131 deviates, for example, from a center of the first frame 130. The second pivot shaft 141 deviates, for example, from a center of the second frame 140. When the second frame 140 is pivotally connected to the first frame 130, the first pivot shaft 131 is not coaxial with the second pivot shaft 141.

The first light transmitting element 150 is fixed in the first frame 130. The second light transmitting element 160 is fixed in the second frame 140 and intersects the first light transmitting element 150. In the embodiment, the first light transmitting element 150 is, for example, divided into a first part 151 and a second part 152. The second frame 140 and the second light transmitting element 160 pass through between the first part 151 and the second part 152, so as to intersect the first frame 130 and the first light transmitting element 150. In an embodiment, the first light transmitting element 150 may include a first dichroic sheet. The second light transmitting element 160 may include a second dichroic sheet. A wavelength range of light reflection and a wavelength range of light penetration of the first dichroic sheet are different from a wavelength range of light reflection and a wavelength range of light penetration of the second dichroic sheet.

Figure 4:
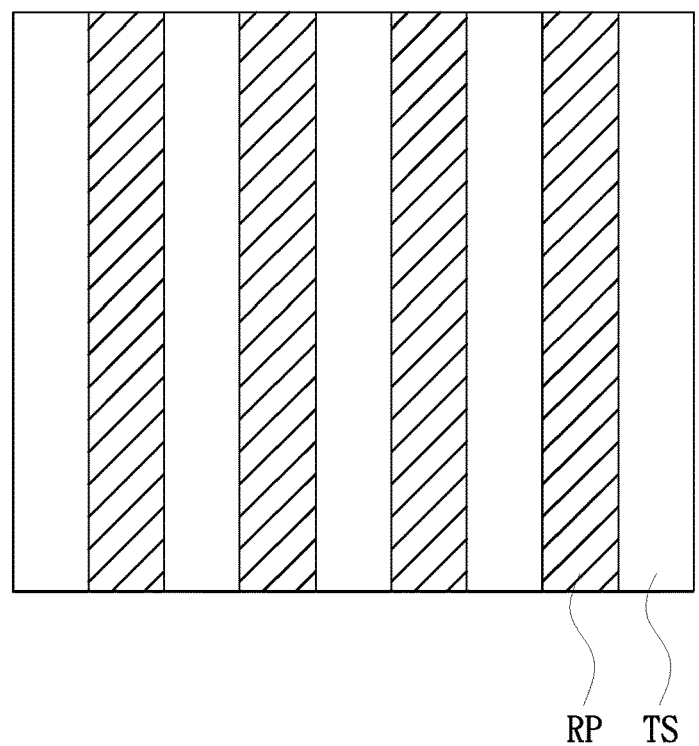
FIG. 4 is a schematic view of a light transmitting element of an embodiment of the invention.

In another embodiment, as shown in FIG. 4, the first light transmitting element 150 and the second light transmitting element 160 may include a transparent sheet TS and a plurality of reflection patterns RP. The reflection patterns RP are arranged at intervals on the transparent sheet TS. The reflection pattern RP is, for example, a coating plated on the transparent sheet TS. The reflection pattern RP is, for example, in a strip shape, but not limited thereto. In addition, the transparent sheet TS of the first light transmitting element 150 can be divided into a first part 151 and a second part 152 as shown in FIG. 2, so that the second frame 140 and the second light transmitting element 160 pass through between the first part 151 and the second part 152.

Figure 5:
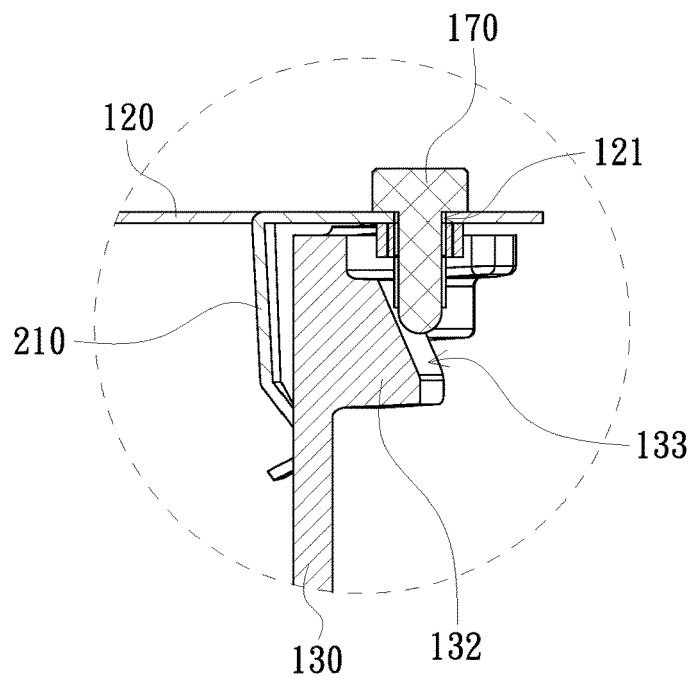
FIG. 5 is a schematic view of a first adjustment member abutting against a first frame in accordance with an embodiment of the invention.

Please refer to FIG. 2 and FIG. 3 again. The first adjustment member 170 passes through the cover 120 and abuts against the first frame 130. The first adjustment member 170 is used for driving the first frame 130 to rotate. FIG. 5 is a schematic view of a first adjustment member abutting against a first frame in accordance with an embodiment of the invention. Please refer to FIG. 3 and FIG. 5. In the embodiment, the first frame 130 has, for example, a first wedge-shaped structure 132. The first wedge-shaped structure 132 has a first bevel surface 133. The cover 120 has, for example, a passage hole 121. The first adjustment member 170 is, for example, an adjustment rod. The adjustment rod may be a screw or other type of rod. The first adjustment member 170 passes through the cover 120 via the passage hole 121 to abut against the first bevel surface 133. As such, when the first adjustment member 170 is adjusted downward, the first adjustment member 170 moves downward along the first bevel surface 133. By pushing the first wedge-shaped structure 132, the first frame 130 is rotated along a counterclockwise direction D1 in FIG. 3 by the first pivot shaft 131. The first light transmitting element 150 also rotates accordingly. Thus, a disposition angle of the first light transmitting element 150 can be adjusted. The range of the disposition angle is ±2 degrees.

The light combining device 100 of the embodiment may further include a first elastic sheet 210, connected to the cover 120 and abutting against the first frame 130. The first elastic sheet 210 and the first adjustment member 170 abut against two opposite sides of the first frame 130. The first elastic sheet 210 is, for example, formed by punching the cover 120. In other embodiments, the first elastic sheet 210 may also be connected to the cover 120 in some other way. When the first adjustment member 170 is adjusted downward to rotate the first frame 130 along the counterclockwise direction D1 in FIG. 3, the first frame 130 pushes the first elastic sheet 210. When the first adjustment member 170 is adjusted upwards, the elastic restoring force of the first elastic sheet 210 pushes the first frame 130 to rotate along a clockwise direction D2 in FIG. 3. The first light transmitting element 150 also rotates accordingly. Thus, the disposition angle of the first light transmitting element 150 can be adjusted.

Figure 6:
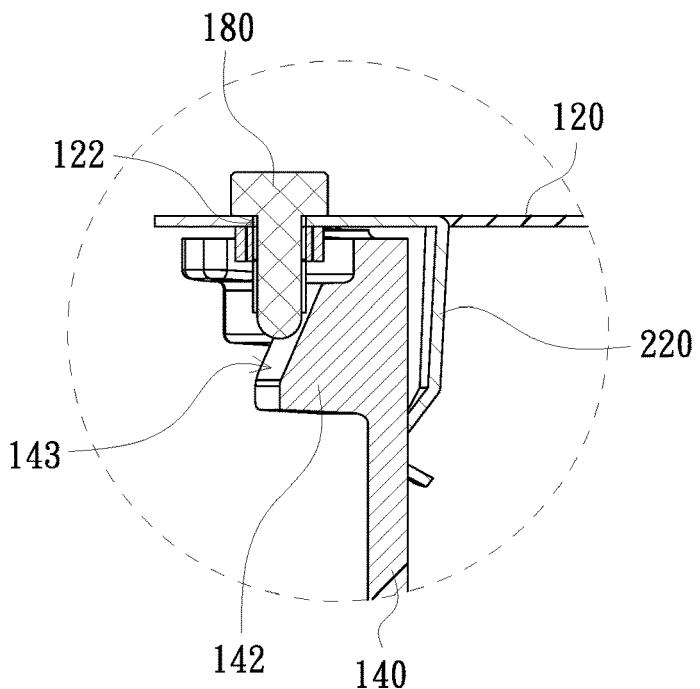
FIG. 6 is a schematic view of a second adjustment member abutting against a second frame in accordance with an embodiment of the invention.

Similarly, as shown in FIG. 2 and FIG. 3, the second adjustment member 180 passes through the cover 120 and abuts against the second frame 140. The second adjustment member 180 is used for driving the second frame 140 to rotate. FIG. 6 is a schematic view of a second adjustment member abutting against a second frame in accordance with an embodiment of the invention. Please refer to FIG. 3 and FIG. 6. In the embodiment, the second frame 140 has, for example, a second wedge-shaped structure 142. The second wedge-shaped structure 142 has a second bevel surface 143. The cover 120 has, for example, a passage hole 122. The second adjustment member 180 is, for example, an adjustment rod. The adjustment rod may be a screw or other type of rod. The second adjustment member 180 passes through the cover 120 via the passage hole 122 to abut against the second bevel surface 143. As such, when the second adjustment member 180 is adjusted downward, the second adjustment member 180 moves downward along the second bevel surface 143. By pushing the second wedge-shaped structure 142, the second frame 140 is rotated along the clockwise direction D2 in FIG. 3 by the second pivot shaft 141. The second light transmitting element 160 also rotates accordingly. Thus, a disposition angle of the second light transmitting element 160 can be adjusted. The range of the disposition angle is ±2 degrees.

The light combining device 100 of the embodiment further includes a second elastic sheet 220, connected to the cover 120 and abutting against the second frame 140. The second elastic sheet 220 and the second adjustment member 180 abut against two opposite sides of the second frame 140. The second elastic sheet 220 is, for example, formed by punching the cover 120. In other embodiments, the second elastic sheet 220 may also be connected to the cover 120 in some other way. When the second adjustment member 180 is adjusted downward to rotate the second frame 140 along the clockwise direction D2 in FIG. 3, the second frame 140 pushes the second elastic sheet 220. When the second adjustment member 180 is adjusted upwards, the elastic restoring force of the second elastic sheet 220 pushes the second frame 140 to rotate along the counterclockwise direction D1 in FIG. 3. The second light transmitting element 160 also rotates accordingly. Thus, the disposition angle of the second light transmitting element 160 can be adjusted.

Please refer to FIG. 1 and FIG. 3 again. The light combining device 100 of the embodiment further includes a first fixing member 240 and a second fixing member 250. After a disposition angle of the first frame 130 is adjusted well, the first fixing member 240 can pass through the cover 120 and be fixed to the first frame 130 so that the first frame 130 is fixed and not able to rotate. The first frame 130 has, for example, a first fixing hole 134. The first fixing member 240 is, for example, fixed in the first fixing hole 134. In addition, after a disposition angle of the second frame 140 is adjusted well, the second fixing member 250 can pass through the cover 120 and be fixed to the second frame 140 so that the second frame 140 is fixed and not able to rotate. The second frame 140 has, for example, a second fixing hole 144. The second fixing member 250 is, for example, fixed in the second fixing hole 144.

Figure 7:
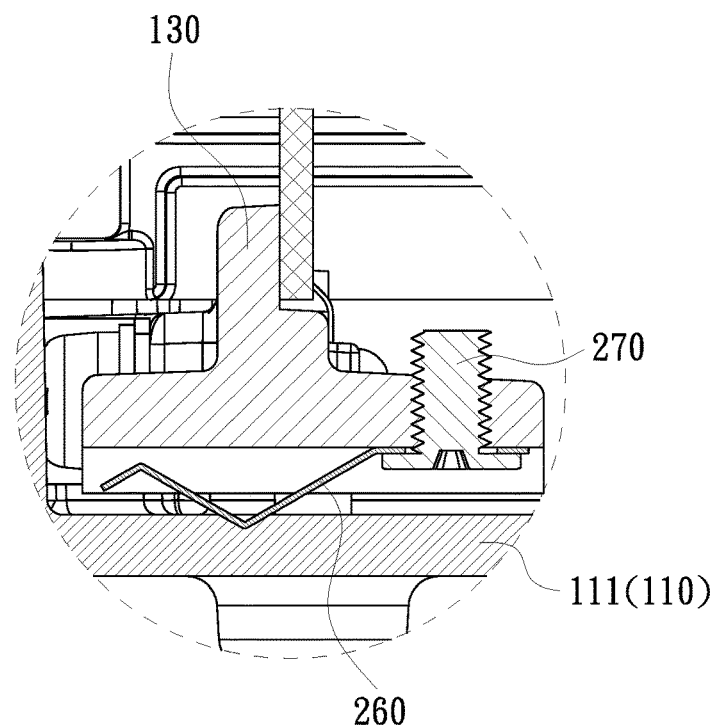
FIG. 7 is a schematic partial cross-sectional view of an X-type adjustment module of an embodiment of the invention.
Figure 8:
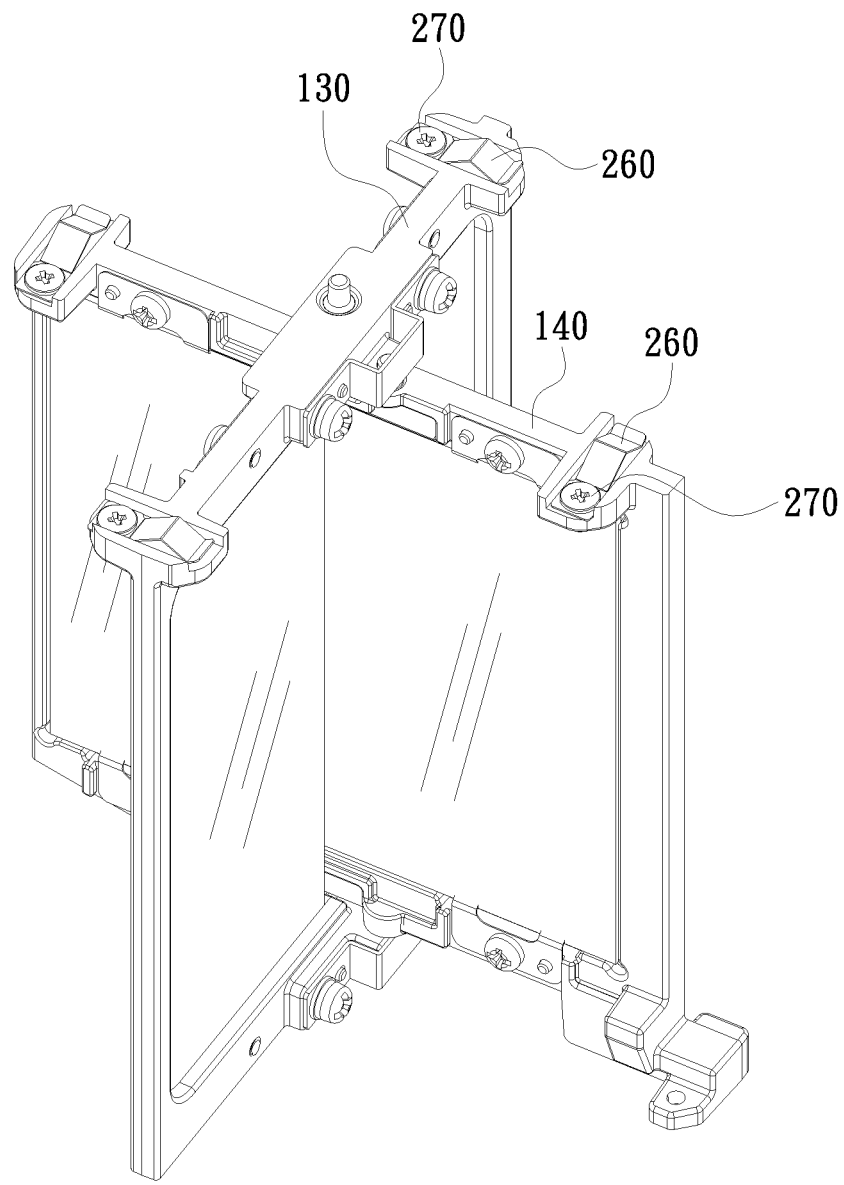
FIG. 8 is a schematic view of FIG. 3 upside down.

FIG. 7 is a schematic partial cross-sectional view of a light combining device of an embodiment of the invention. Please refer to FIG. 7. The light combining device 100 of the embodiment may further include an elastic sheet 260, disposed between the bottom 111 of the base 110 and the first frame 130, so as to push the first frame 130. This way is advantageous for fixing the first fixing member 240 of FIG. 1 in the first frame 130. In the embodiment, the elastic sheet 260 is fixed on the first frame 130 by, for example, a fixing member 270. FIG. 8 is a schematic view of FIG. 3 upside down. As shown in FIG. 8, the number of the elastic sheets 260 may be plural. In addition to being disposed between the bottom 111 of the base 110 and the first frame 130, the elastic sheet 260 may be disposed between the bottom 111 of the base 110 and the second frame 140, so as to push the second frame 140. This way is advantageous for fixing the second fixing member 250 of FIG. 1 in the second frame 140. Although the elastic sheet 260 is fixed to the first frame 130 and the second frame 140 as an example in the embodiment, the elastic sheet 260 may be fixed to the bottom 111 of the base 110 in another embodiment.

Figure 9:
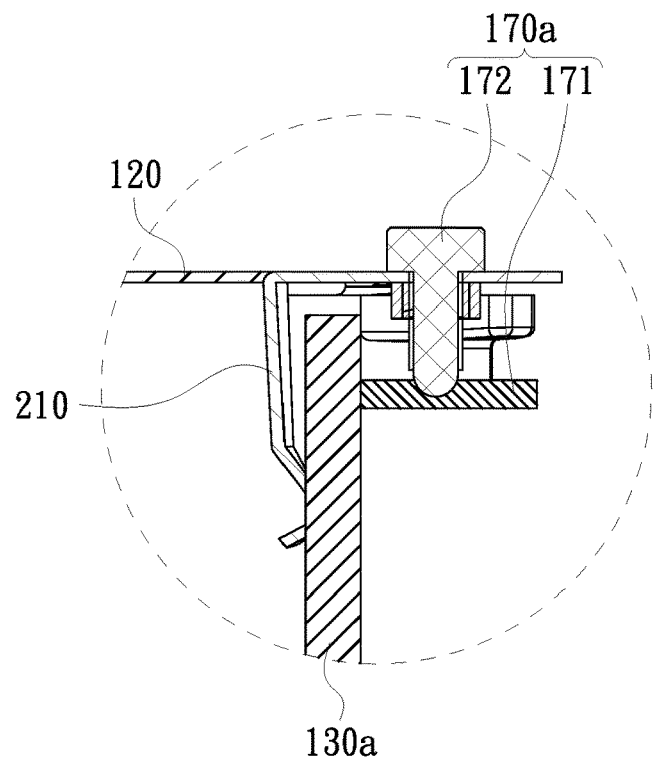
FIG. 9 is a schematic view of a first adjustment member abutting against a first frame in accordance with another embodiment of the invention.
Figure 10:
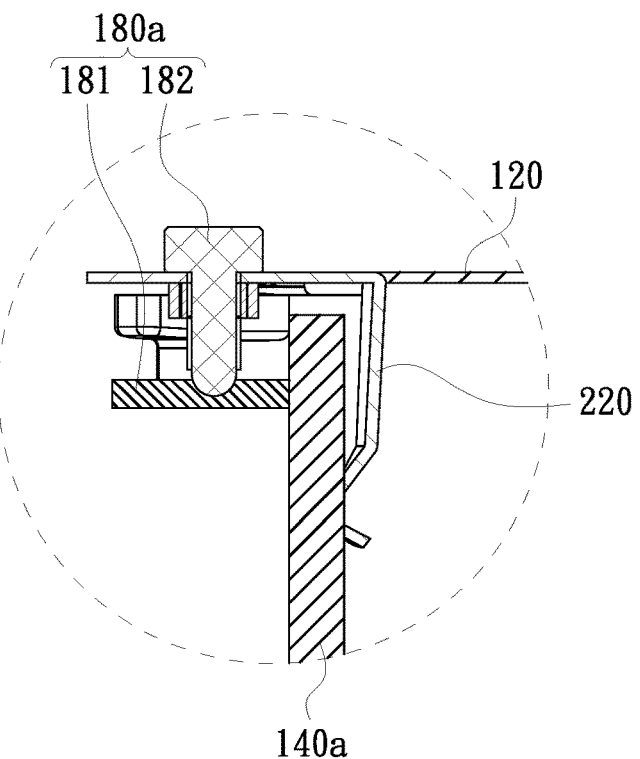
FIG. 10 is a schematic view of a second adjustment member abutting against a second frame in accordance with another embodiment of the invention.

In the X-type adjustment module 101 of the embodiment, the first adjustment member 170 and the second adjustment member 180 are adjustment rods, and the first frame 130 and the second frame 140 have the first wedge-shaped structure 132 and the second wedge-shaped structure 142 respectively, so as to achieve the purpose of adjusting the disposition angles of the first frame 130 and the second frame 140. But the invention is not limited thereto. For example, as shown in FIG. 9, a first adjustment member 170a includes, for example, a first cam 171 and a first rotational rod 172. The first cam 171 abuts against a first frame 130a. The first rotational rod 172 passes through the cover 120 and is connected to the first cam 171. When the first cam 171 is rotated by the first rotational rod 172, the first cam 171 can push the first frame 130a to rotate back and forth within a predetermined angular range, so that the purpose of adjusting a disposition angle of the first frame 130a can be achieved. The first rotational rod 172 is not disposed at a center of the first cam 171. Therefore, the first cam 171 abuts against the first frame 130a with an asymmetrical rotation. Similarly, as shown in FIG. 10, a second adjustment member 180a includes a second cam 181 and a second rotational rod 182. The second cam 181 abuts against a second frame 140a. The second rotational rod 182 passes through the cover 120 and is connected to the second cam 181. When the second cam 181 is rotated by the second rotational rod 182, the second cam 181 can push the second frame 140a to rotate back and forth within a predetermined angular range. Thus, the purpose of adjusting a disposition angle of the second frame 140a can be achieved. The second rotational rod 182 is not disposed at a center of the second cam 181. Therefore, the second cam 181 abuts against the second frame 140a with an asymmetrical rotation.

Figure 11:
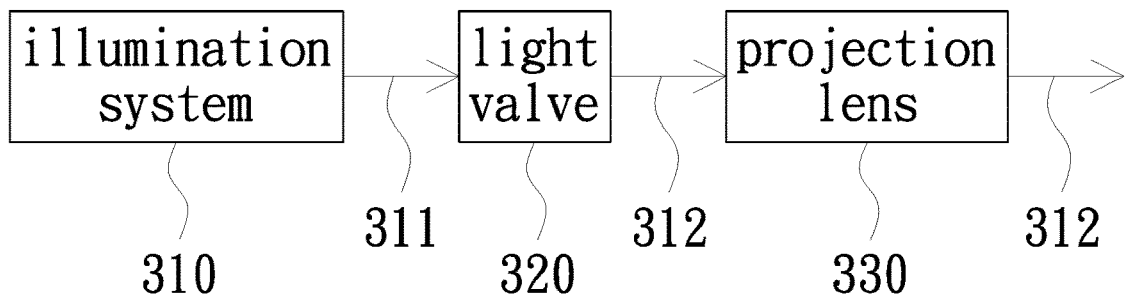
FIG. 11 is a schematic block diagram of a projector of an embodiment of the invention.

FIG. 11 is a schematic block diagram of a projector of an embodiment of the invention. Please refer to FIG. 11. The projector 300 of the embodiment includes an illumination system 310, a light valve 320, and a projection lens 330. The illumination system 310 is used for providing an illumination beam 311. The light valve 320 is disposed on a transmission path of the illumination beam 311, so as to convert the illumination beam 311 into an image beam 312. The projection lens 330 is disposed on a transmission path of the image beam 312, so as to project the image beam 312 onto a screen (not shown in the figure) to form an image picture on the screen. The light valve 320 may be a transmissive light valve or a reflective light valve. The transmissive light valve may be a transmissive liquid crystal display panel. The reflective light valve may be a digital micro-mirror device or a liquid crystal on silicon panel, but not limited thereto. In addition, the number of the light valves 320 may be one or more (for example, three).

Figure 12:
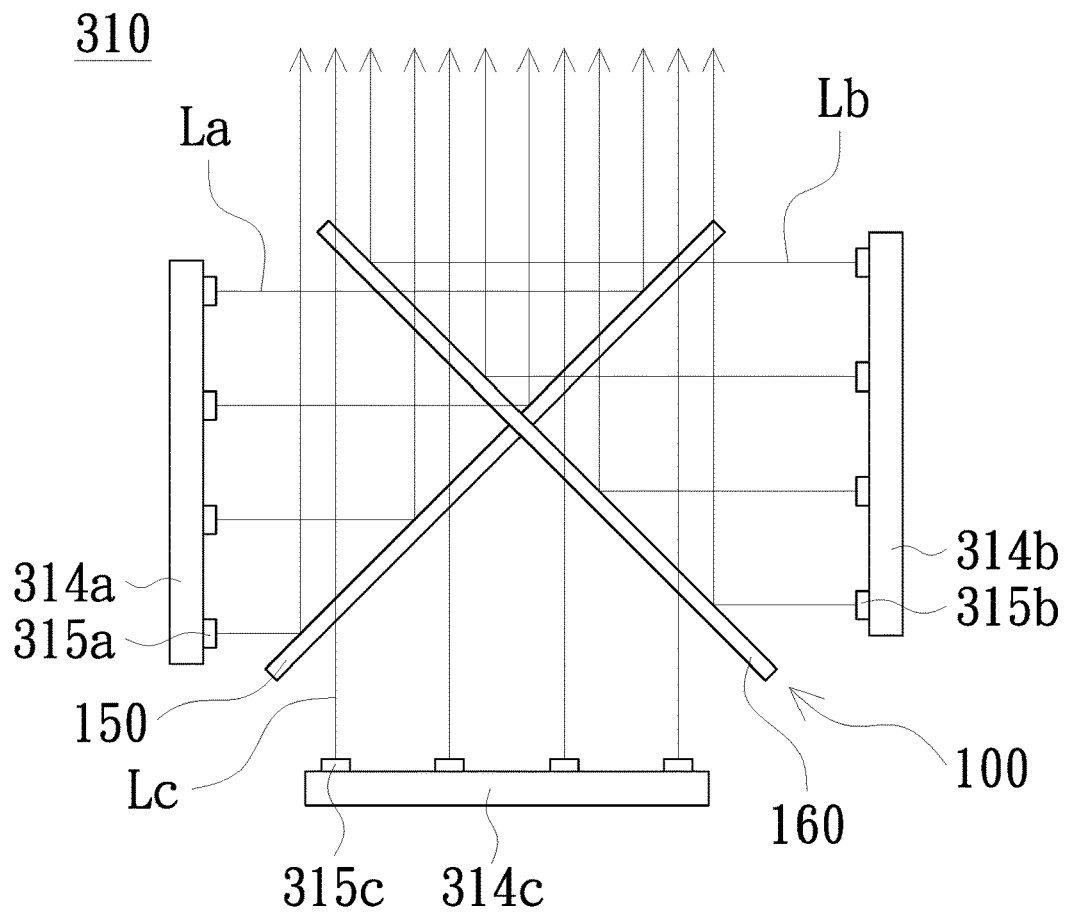
FIG. 12 is a schematic view of an illumination system of a projector of an embodiment of the invention.

FIG. 12 is a schematic view of an illumination system of a projector of an embodiment of the invention. Please refer to FIG. 12. The illumination system 310 of the embodiment includes the light combining device of any one of the aforementioned embodiments (the light combining device 100 is taken as an example in FIG. 12) and three light source groups, i.e., a first light source group 314a, a second light source group 314b, and a third light source group 314c. The first light source group 314a is opposite to the second light source group 314b. The light source groups (the first light source group 314a, the second light source group 314b, and the third light source group 314c) are disposed at three sides of the light combining device 100 and include a plurality of point light sources, respectively. Each of the point light sources is used for providing a sub-beam. Specifically, the first light source group 314a includes a plurality of point light sources 315a. Each of the point light sources 315a is used for providing a sub-beam La. The second light source group 314b includes a plurality of point light sources 315b. Each of the point light sources 315b is used for providing a sub-beam Lb. The third light source group 314c includes a plurality of point light sources 315c. Each of the point light sources 315c is used for providing a sub-beam Lc. The light combining device 100 is used for combining the sub-beams La, Lb and Lc. In addition, the first light source group 314a, the second light source group 314b, and the third light source group 314c may be light emitting diode (LED) light source groups or LASER light source groups, but not limited thereto.

Please refer to FIG. 1 and FIG. 12. The base 110 has, for example, a plurality of side walls 114 connected to the bottom 111. The first light source group 314a, the second light source group 314b, and the third light source group 314c may be fixed on the different side walls 114, respectively. The side walls 114 have a plurality of passage holes 115 respectively, so as to accommodate the point light sources 315a, 315b, and 315c. The point light sources of each of the light source groups are, for example, arranged in an array. That is, the point light sources 315a are arranged in an array, the point light sources 315b are arranged in an array, and the point light sources 315c are arranged in an array. The passage holes 115 of each of the side walls 114 are also correspondingly arranged in an array.

In an embodiment, the first light transmitting element 150 of the light combining device 100 is the first dichroic sheet. The second light transmitting element 160 is the second dichroic sheet. The first light source group 314a, the second light source group 314b, and the third light source group 314c are the light source groups of different colors. The first light transmitting element 150 is used for reflecting the sub-beam La provided by the point light source 315a and allowing the sub-beams Lb and Lc provided by the point light sources 315b and 315c to pass therethrough. The second light transmitting element 160 is used for reflecting the sub-beam Lb provided by the point light source 315b and allowing the sub-beams La and Lc provided by the point light sources 315a and 315c to pass therethrough. The sub-beams La, Lb and Lc may be one of red light, blue light and green light, respectively. Therefore, the illumination beam 311 in FIG. 11 may include red light, blue light, and green light.

In the embodiment, since the disposition angles of the first light transmitting element 150 and the second light transmitting element 160 can be individually adjusted, The transmission paths of the sub-beams La and Lb that have been reflected can be controlled by adjusting the disposition angles of the first light transmitting element 150 and the second light transmitting element 160, so as to allow each of the sub-beams La, Lb and Lc to be emitted with an even distribution to exit from the light combining device 100, so that the sub-beams La, Lb and Lc can have a good light combining effect. Compared with the prior art, such an adjustment manner in the embodiment helps to improve the assembly efficiency of the projector 300.

Figure 13:
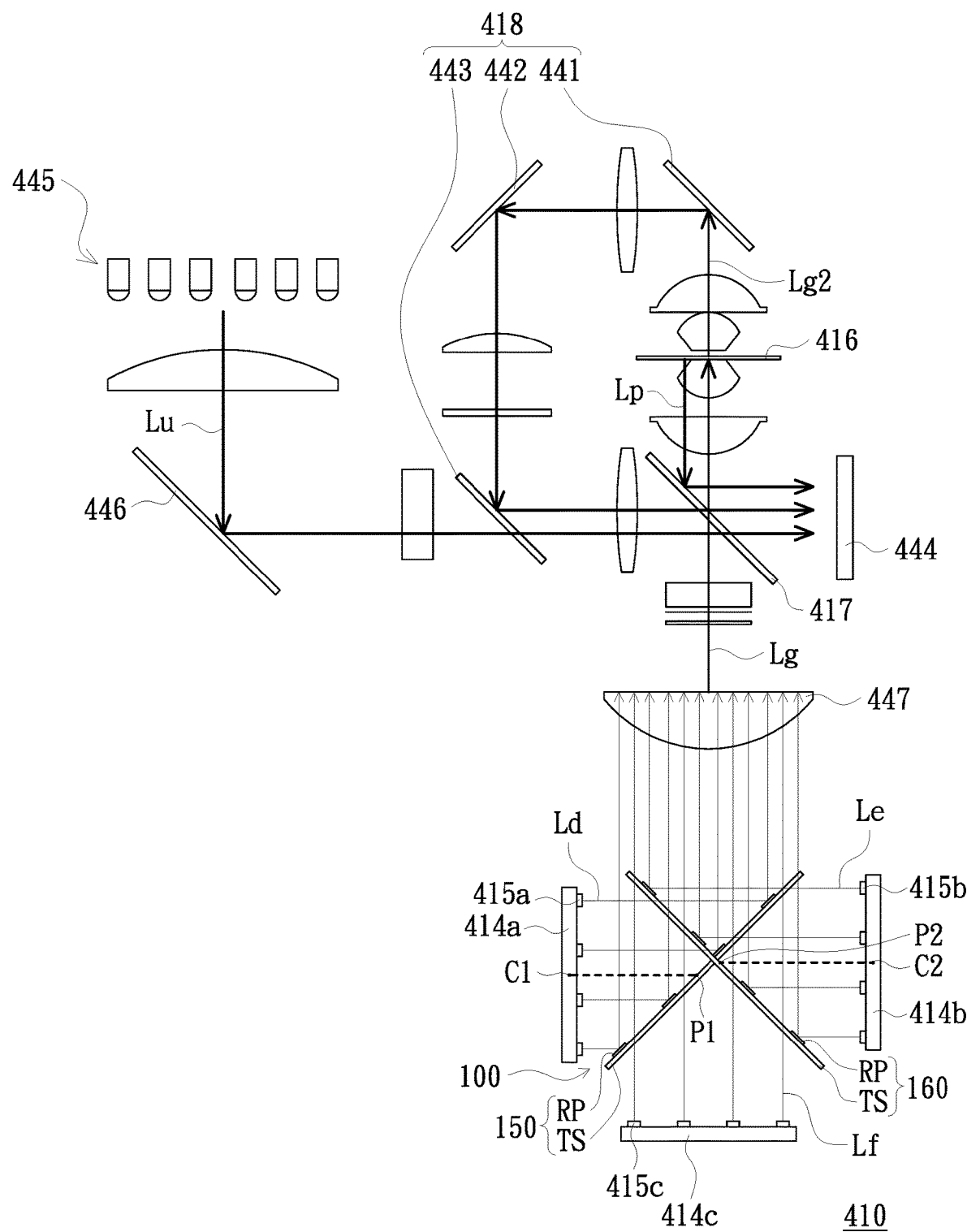
FIG. 13 is a schematic view of an illumination system of a projector of another embodiment of the invention.

FIG. 13 is a schematic view of an illumination system of a projector of another embodiment of the invention. Please refer to FIG. 13. Similar to the illumination system 310 of FIG. 12, a first light source group 414a, a second light source group 414b, and a third light source group 414c of an illumination system 410 of the embodiment are disposed at three sides of the light combining device 100. The point light sources 415a, 415b, and 415c of the first light source group 414a, the second light source group 414b, and the third light source group 414c are excitation light sources, such as laser diodes. Sub-beams Ld, Le and Lf provided by the point light sources 415a, 415b and 415c have, for example, the same wavelength range, for example, all of which are blue light. The point light source 415a of the first light source group 414a corresponds to the point light source 415b of the second light source group 414b with spacing therebetween, so as to prevent the sub-beam Ld provided by the first light source group 414a from overlapping with the sub-beam Le provided by the second light source group 414b. In addition, a disposition position of the third light source group 414c needs to be arranged so that the sub-beam Ld provided by the first light source group 414a, the sub-beam Le provided by the second light source group 414b, and the sub-beam Lf provided by the third light source group 414c do not overlap with one another after passing through the light combining device 100. The sub-beams Ld, Le and Lf exit from the light combining device 100 with an even distribution and are projected to a lens 447.

A center C1 of the first light source group 414a corresponds to a first position P1 of the first light transmitting element 150. An axis of the first pivot shaft 131 (shown in FIG. 3) passes through the first position P1. That is, the center C1 of the first light source group 414a corresponds, for example, to the first pivot shaft 131. In addition, a center C2 of the second light source group 414b corresponds to a second position P2 of the second light transmitting element 160. An axis of the second pivot shaft 141 (shown in FIG. 2) passes through the second position P2. That is, the center C2 of the second light source group 414b corresponds to the second pivot shaft 141.

In the embodiment, the first light transmitting element 150 and the second light transmitting element 160 are, for example, the structures shown in FIG. 4. The point light source 415a of the first light source group 414a corresponds to spacing between the reflection patterns RP of the second light transmitting element 160, and the reflection pattern RP of the first light transmitting element 150, so that the sub-beam Ld provided by the point light source 415a of the first light source group 414a can pass through the second light transmitting element 160 and be reflected by the reflection pattern RP of the first light transmitting element 150. The point light source 415b of the second light source group 414b corresponds to spacing between the reflection patterns RP of the first light transmitting element 150, and the reflection pattern RP of the second light transmitting element 160, so that the sub-beam Ld provided by the point light source 415b of the second light source group 414b can pass through the second light transmitting element 160 and be reflected by the reflection pattern RP of the first light transmitting element 150. The point light source 415c of the third light source group 414c corresponds to spacing between the reflection patterns RP of the first light transmitting element 150, and spacing between the reflection patterns RP of the second light transmitting element 160, so that the sub-beam Lf provided by the point light source 415c of the third light source group 414c can pass through the first light transmitting element 150 and the second light transmitting element 160 and be combined with the sub-beams Ld and Lf.

The illumination system 410 of the embodiment further includes, for example, a phosphor wheel 416, a first dichroic element 417, and a reflective component 418. The phosphor wheel 416 is disposed on a transmission path of the sub-beam that has passed through the light combining device 100. In FIG. 13, a sub-beam Lg represents the sub-beams Ld, Le and Lf that are combined by the light combining device 100. The phosphor wheel 416 is used for converting a first portion of the sub-beam in the sub-beam Lg into a fluorescence beam Lp and reflecting the fluorescence beam Lp. A second portion of the sub-beam Lg2 in the sub-beam Lg is allowed to pass through the phosphor wheel 416. Specifically, the phosphor wheel 416 has a phosphor zone and a transparent zone. With the rotation of the phosphor wheel 416, the phosphor zone and the transparent zone are alternately irradiated by the sub-beam Lg. The sub-beam Lg irradiated to the phosphor zone is the first portion of the sub-beam, which can generate the fluorescence beam Lp by excitation at the phosphor zone. The sub-beam Lg irradiated to the transparent zone is the second portion of the sub-beam Lg2.

The first dichroic element 417 is disposed between the phosphor wheel 416 and the light combining device 100. The first dichroic element 417 is used for allowing the sub-beam Lg to pass therethrough and reflecting the fluorescence beam Lp.

The reflective component 418 is disposed on a transmission path of the second portion of the sub-beam Lg2. The reflective component 418 is used for reflecting the second portion of the sub-beam Lg2 back to the first dichroic element 417, so as to be combined with the fluorescence beam Lp after passing through the first dichroic element 417. The reflective component 418 of the embodiment includes, for example, a first reflective element 441, a second reflective element 442, and a second dichroic element 443. The second portion of the sub-beam Lg2 passes through the first dichroic element 417 after being sequentially reflected by the first reflective element 441, the second reflective element 442, and the second dichroic element 443.

In an embodiment, the phosphor zone includes at least a yellow phosphor. Thus the fluorescence beam Lp includes at least yellow light. The phosphor zone may further include a green phosphor or a phosphor of other colors. Therefore, the fluorescence beam Lp may further include green light or other colored light. The sub-beam Lg is, for example, blue light. The illumination system 410 further includes a color wheel 444, disposed on the transmission path of the fluorescence beam Lp and the second portion of the sub-beam Lg2, so as to form red light, green light, and blue light.

The illumination system 410 further includes an auxiliary light source 445, for providing an auxiliary beam Lu that sequentially passes through the second dichroic element 443 and the first dichroic element 417, so as to be combined with the fluorescence beam Lp and the second portion of the sub-beam Lg2. The auxiliary light source 445 can be used for enhancing the color performance of the projector. The color of the auxiliary light source 445 can be selected according to the needs. In addition, the illumination system 410 further includes, for example, a third reflective element 446, disposed between the auxiliary light source 445 and the second dichroic element 443. The third reflective element 446 is used for reflecting the auxiliary beam Lu, so that the auxiliary beam Lu sequentially passes through the second dichroic element 443 and the first dichroic element 417. In an embodiment, the third reflective element 446 may be omitted, and a position of the auxiliary light source 445 needs to be adjusted accordingly. In an embodiment where the auxiliary light source 445 is not used, the second dichroic element 443 may be replaced with a reflective element. In addition, the illumination system 410 further includes a plurality of optical elements (for example, lenses), disposed between the above-mentioned elements.

Figure 14:
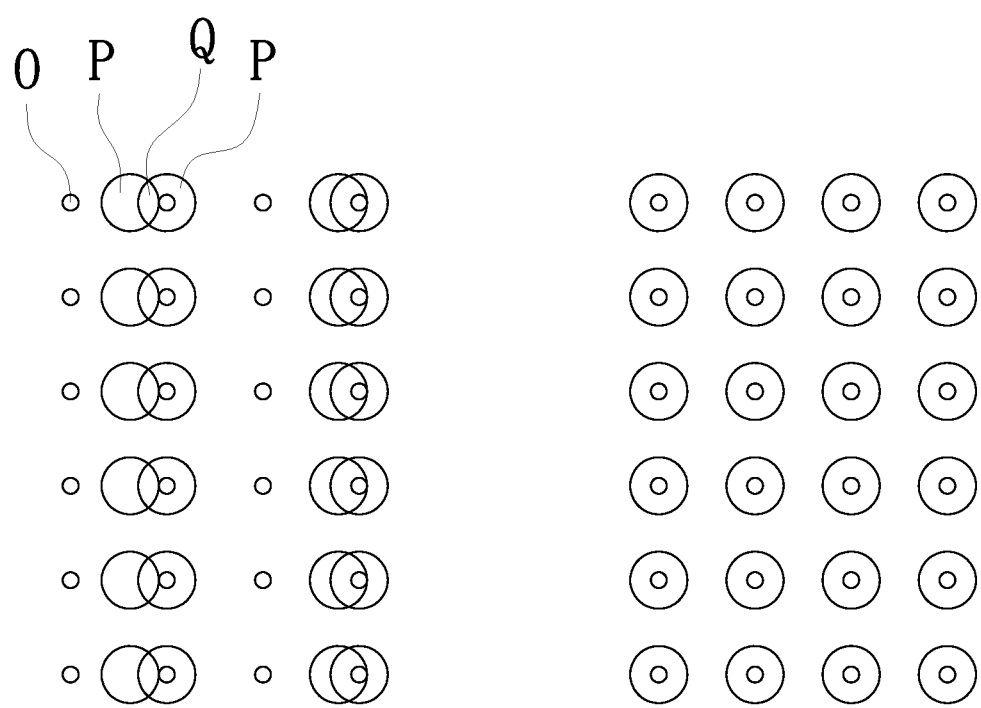
FIG. 14 is a comparison diagram of light spots transmitted by a light combining device in accordance with an embodiment of the invention.

FIG. 14 is a comparison diagram of light spots transmitted by a light combining device in accordance with an embodiment of the invention. Please refer to FIG. 13 and FIG. 14. Referring to the left side of FIG. 14, the disposition angle of the first light transmitting element 150 is not adjusted, so that the sub-beam Le is not projected to a predetermined projection position O. A light spot P of the sub-beam Le and a light spot P of the sub-beam Ld thus overlap to form an overlapping area Q, causing the light energy to be too concentrated and resulting in damage of the phosphor zone of the phosphor wheel 416. Referring to the right side of FIG. 14, in the embodiment, since the disposition angles of the first light transmitting element 150 and the second light transmitting element 160 can be individually adjusted, the sub-beams Le and Ld may be prevented from overlapping with each other or overlapping with the sub-beam Lf by adjusting the disposition angles of the first light transmitting element 150 and the second light transmitting element 160, so that the sub-beams Le, Ld and Lf are emitted with an even distribution to exit from the light combining device 100. In this way, the phosphor zone of the phosphor wheel 416 can be prevented from being damaged by the excessive concentration of the light energy.

In summary, in the light combining device of the embodiment of the invention, since the first frame is pivotally connected between the bottom of the base and the cover, and the second frame is pivotally connected to the first frame, the disposition angles of the first frame and the second frame can be individually adjusted. The disposition angles of the first light transmitting element and the second light transmitting element that are disposed at the first frame and the second frame can also be adjusted accordingly. Since the projector of the embodiment of the invention utilizes this light combining device, a transmission path of the sub-beam, which is provided by the light source group and has been reflected, can be controlled by adjusting the disposition angles of the first light transmitting element and the second light transmitting element, so as to help to improve the assembly efficiency of the projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first frame, the second frame, the first pivot shaft, the second pivot shaft, the first wedge-shaped structure, the second wedge-shaped structure, the first bevel surface, the second bevel surface, the first fixing hole, the second fixing hole, the first light transmitting element, the second light transmitting element, the first part, the second part, the first adjustment member, the second adjustment member, the first cam, the second cam, the first rotational rod, the second rotational rod, the first elastic sheet, the second elastic sheet, the first fixing member, the second fixing member, the first light source group, the second light source group, the third light source group, the first dichroic element, the second dichroic element, the first reflective element, the second reflective element, the third reflective element, the first portion of the sub-beam, the second portion of the sub-beam, the first position, the second position, the first dichroic sheet, and the second dichroic sheet are only used for distinguishing various elements and do not limit the number of the elements.

What is claimed is:

1. A light combining device, comprising:
a base, having a bottom and an opening, wherein the opening is disposed opposite to the bottom; and
an X-type adjustment module, comprising:
a cover, fixed to the opening;

a first frame, pivotally connected between the bottom of the base and the cover;
a second frame, pivotally connected to the first frame and intersecting the first frame;
a first light transmitting element, fixed in the first frame;
a second light transmitting element, fixed in the second frame and intersecting the first light transmitting element;
a first adjustment member, passing through the cover and abutting against the first frame, wherein the first adjustment member is used for driving the first frame to rotate; and
a second adjustment member, passing through the cover and abutting against the second frame, wherein the second adjustment member is used for driving the second frame to rotate,
wherein the first frame has a first wedge-shaped structure, the first wedge-shaped structure has a first bevel surface, the second frame has a second wedge-shaped structure, the second wedge-shaped structure has a second bevel surface, the first adjustment member and the second adjustment member comprise an adjustment rod respectively, and the adjustment rods abut against the first bevel surface and the second bevel surface respectively.

2. A light combining device, comprising:
a base, having a bottom and an opening, wherein the opening is disposed opposite to the bottom; and
an X-type adjustment module, comprising:
a cover, fixed to the opening;
a first frame, pivotally connected between the bottom of the base and the cover;
a second frame, pivotally connected to the first frame and intersecting the first frame;
a first light transmitting element, fixed in the first frame;
a second light transmitting element, fixed in the second frame and intersecting the first light transmitting element;
a first adjustment member, passing through the cover and abutting against the first frame, wherein the first adjustment member is used for driving the first frame to rotate; and
a second adjustment member, passing through the cover and abutting against the second frame, wherein the second adjustment member is used for driving the second frame to rotate,
wherein the first adjustment member comprises a first cam and a first rotational rod, the first cam abuts against the first frame, the first rotational rod passes through the cover and is connected to the first cam, the second adjustment member comprises a second cam and a second rotational rod, the second cam abuts against the second frame, and the second rotational rod passes through the cover and is connected to the second cam.

3. A light combining device, comprising:
a base, having a bottom and an opening, wherein the opening is disposed opposite to the bottom; and
an X-type adjustment module, comprising:
a cover, fixed to the opening;
a first frame, pivotally connected between the bottom of the base and the cover;
a second frame, pivotally connected to the first frame and intersecting the first frame;
a first light transmitting element, fixed in the first frame;
a second light transmitting element, fixed in the second frame and intersecting the first light transmitting element;
a first adjustment member, passing through the cover and abutting against the first frame, wherein the first adjustment member is used for driving the first frame to rotate; and
a second adjustment member, passing through the cover and abutting against the second frame, wherein the second adjustment member is used for driving the second frame to rotate,
wherein the first frame has a first pivot shaft pivotally connected between the base and the cover, the second frame has a second pivot shaft pivotally connected to the first frame, the first pivot shaft deviates from a center of the first frame, the second pivot shaft deviates from a center of the second frame, and the first pivot shaft is not coaxial with the second pivot shaft.

4. The light combining device according to claim 3, further comprising:
a first elastic sheet, connected to the cover and abutting against the first frame, wherein the first elastic sheet and the first adjustment member abut against two opposite sides of the first frame; and
a second elastic sheet, connected to the cover and abutting against the second frame, wherein the second elastic sheet and the second adjustment member abut against two opposite sides of the second frame.

5. The light combining device according to claim 3, wherein the first elastic sheet and the second elastic sheet are formed by punching the cover.

6. The light combining device according to claim 3, further comprising:
a first fixing member, passing through the cover and fixed to the first frame; and
a second fixing member, passing through the cover and fixed to the second frame.

7. The light combining device according to claim 3, further comprising a plurality of elastic sheets, disposed between the bottom of the base and the first frame and between the bottom of the base and the second frame.

8. The light combining device according to claim 3, wherein the first light transmitting element comprises a first dichroic sheet and the second light transmitting element comprises a second dichroic sheet.

9. The light combining device according to claim 3, wherein the first light transmitting element and the second light transmitting element comprise a transparent sheet and a plurality of reflection patterns, and the reflection patterns are arranged at intervals on the transparent sheet.

* * * * *